Aug. 25, 1936.  R. M. DARDEN  2,052,169
DEVICE FOR UNLOADING MATERIALS
Filed Nov. 26, 1934    2 Sheets-Sheet 1

Inventor
Raymond M. Darden
By H V Carpenter
Attorney.

Aug. 25, 1936.  R. M. DARDEN  2,052,169
DEVICE FOR UNLOADING MATERIALS
Filed Nov. 26, 1934    2 Sheets-Sheet 2

— INVENTOR —
RAYMOND M. DARDEN
By H.V. Carpenter
ATTORNEY

Patented Aug. 25, 1936

2,052,169

UNITED STATES PATENT OFFICE 2,052,169

DEVICE FOR UNLOADING MATERIALS

Raymond M. Darden, Endicott, Wash.

Application November 26, 1934, Serial No. 754,796

3 Claims. (Cl. 214—83)

My invention relates to a device for unloading loose or bulk grain or similar material from a truck into any other container such as a freight car or a storage bin. The device includes means for withdrawing grain from the bottom of the truck body by means of adjustable gates and a screw conveyor, delivery of the grain to a blower, and an adjustable pipe for guiding the blown grain into the car or bin.

Figure 1 is a plan view of the device showing the front part of the truck body, the chain drive connecting the shaft of a power supply (preferably a standard reversible power "take-off" associated with the truck engine in the usual manner) with the screw conveyor under the truck body and also with a cross-conveyor and the fan. The method used to adjust the position of the gates in the floor of the truck body and the devices for tilting and rotating the discharge pipe are also shown.

Figure 1:
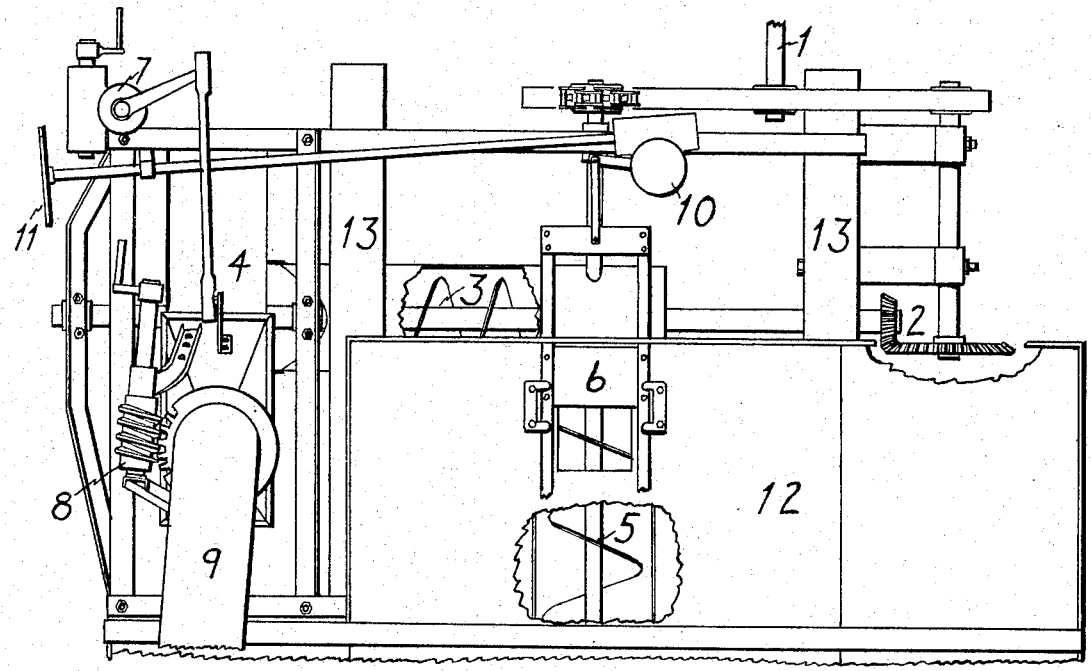

Referring now to Figure 1, the shaft 1, delivers power from the take-off to the sprockets driving the bevel gears 2, and the screw conveyor 5. The bevel gears 2, drive the shaft and conveyor 3; this shaft also carries the fan rotor, preferably of the non-cracking type, in the fan housing 4. The worm and wormwheel 10, with its associated shaft and handle 11, and its crank arm serve to control the position of the sliding gates 6, only one of which is shown. These gates control the rate grain will be fed from the body 12, to the screw, and so the rate of unloading. Another control consists in varying the speed of the truck engine by use of the usual throttle.

Figure 2:
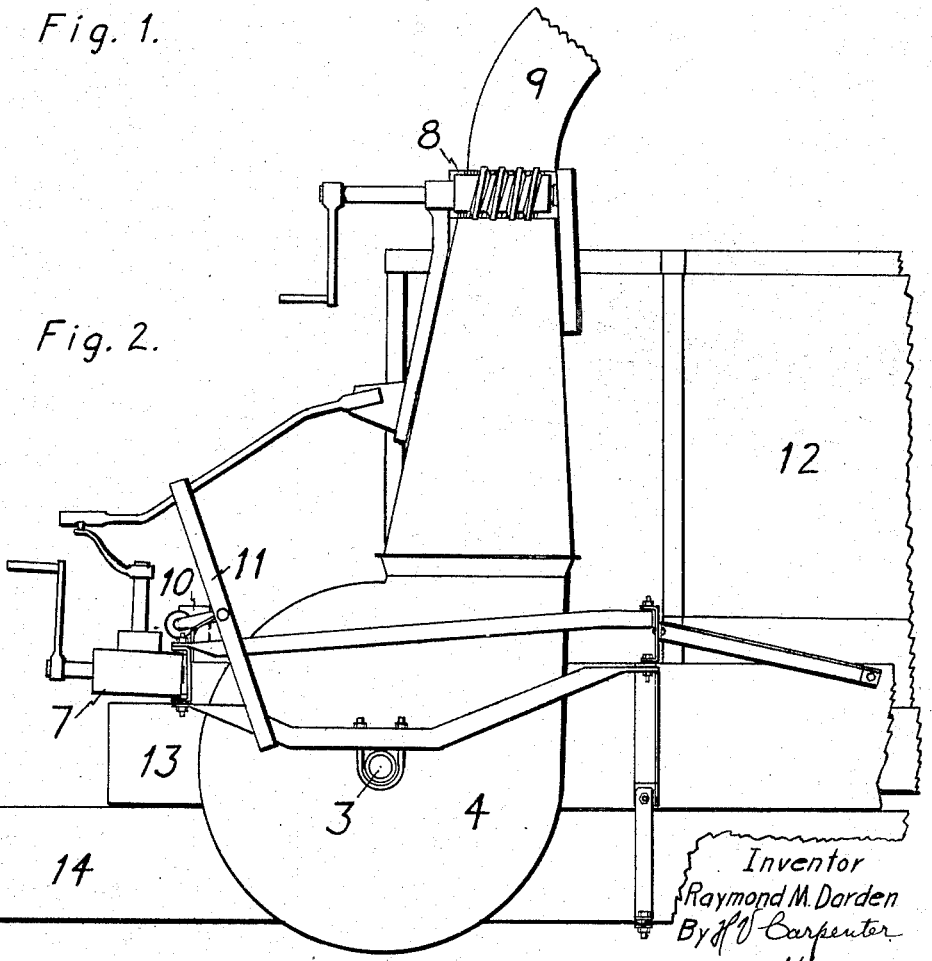
Figure 2 is a side elevation showing more clearly the controls for handling the discharge pipe, and shows in part the attachment of the entire device together with the truck body to the truck chassis so that it is a removable attachment for a truck. The same number is used to mark all views of any part shown in all figures.

The height of the end of the discharge pipe is controlled by means of the worm and wormwheel 7, with its connecting links shown best in Figure 2 which shows also that the fan housing 4, with the attached pipe 9, is rotatable about the main fan shaft 3.

Worm and wormwheel 8, provides means for rotating the pipe, (of which only part of the elbow 9, is shown), about for convenience in reaching the bin or car.

Figure 3:
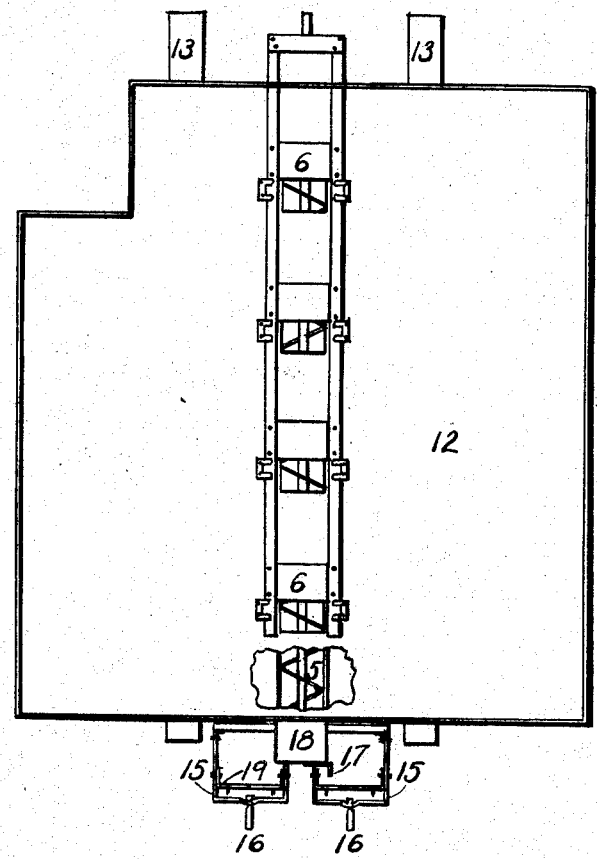
Figure 3 is a plan view of the entire truck body, omitting all machinery except the main conveyor screw and the gate mechanism together with the rear discharge gate device.
Figure 4:
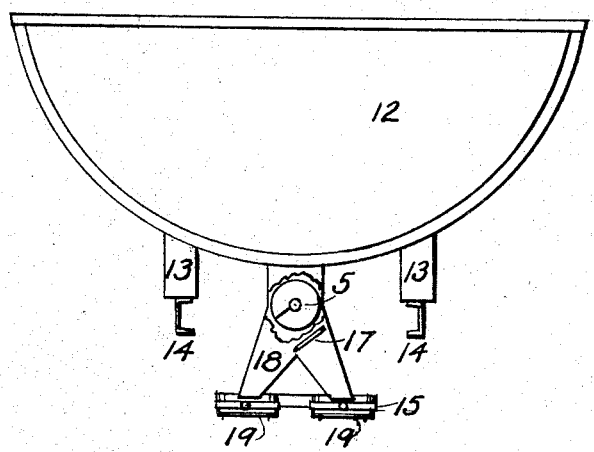
Figure 4 is a rear elevation which shows in more detail the way in which an ordinary double gate for sacking is associated with the main screw conveyor.

By having a reversing device associated with the power take-off it is possible to deliver the grain to the back end of the truck instead of the forward end where it may be dropped into containers or a common sacking attachment may be used, as shown in Figures 3 and 4.

The body 12, and the entire device except the shaft and sprocket coming from the power take-off are mounted on the sills 13, 13, so as to be quickly removable from the truck chassis.

It will be understood that a belt or a gear train may replace the chain belt shown, that universal joints may be included in the shafts 3 or 5, that a flexible pipe with suitable controls can be used to get the needed range of adjustment of the place of discharge and that various other common methods may be used to move the adjustable gates and to adjust the place of discharge.

I claim:

1. In an attachment to a motor truck for hauling and unloading materials, a combination using power from a standard reversible power take-off and comprising a truck body with adjustable bottom gates, a screw conveyor beneath the gates, a second screw conveyor placed to receive material from the first conveyor, a blower placed to receive the material from the second conveyor and a pipe adjustable in height and direction of discharge to receive and deliver material from the blower, and including a gate at the back end of the truck body and first conveyor for discharging when the take-off is reversed.

2. A removable body for a truck with which body is combined bottom discharge gates, a screw conveyor beneath the gates, said conveyor being fitted with a gravity discharge gate at the rear of the body, a fan blower with adjustable delivery pipe, and means for delivering grain from the screw conveyor to the fan when the conveyor is reversed so as to deliver material to the front end of the body.

3. An easily detachable motor truck body combined with adjustable bottom discharge gates, a screw conveyor to which said gates discharge, a gravity discharge gate receiving material from the said conveyor when rotating in one direction, a second conveyor receiving material from the first said conveyor when running in the reversed direction of rotation, a blower mounted to receive material from the second said conveyor, and an adjustable discharge pipe from the blower, all to be driven by a reversible power take-off from the truck engine.

RAYMOND M. DARDEN.